(12) United States Patent
Fatzer et al.

(10) Patent No.: US 10,061,736 B2
(45) Date of Patent: Aug. 28, 2018

(54) DRIVE MESSAGE ROUTER

(71) Applicant: Spectra Logic Corporation, Boulder, CO (US)

(72) Inventors: David John Fatzer, Boulder, CO (US); Matthew John Ninesling, Littleton, CO (US); Matthew Thomas Starr, Lafyette, CO (US)

(73) Assignee: Spectra Logic, Corp, Boulder, CO (US)

( * ) Notice: Subject to any disclaimer, the term of this patent is extended or adjusted under 35 U.S.C. 154(b) by 433 days.

(21) Appl. No.: 14/684,105

(22) Filed: Apr. 10, 2015

(65) Prior Publication Data
US 2015/0293878 A1 Oct. 15, 2015

Related U.S. Application Data

(60) Provisional application No. 61/978,612, filed on Apr. 11, 2014.

(51) Int. Cl.
G06F 13/36 (2006.01)
G06F 13/42 (2006.01)
G06F 13/40 (2006.01)
G06F 3/06 (2006.01)

(52) U.S. Cl.
CPC ...... G06F 13/4234 (2013.01); G06F 13/4068 (2013.01); G06F 13/4286 (2013.01); G06F 3/0658 (2013.01); G06F 3/0689 (2013.01)

(58) Field of Classification Search
None
See application file for complete search history.

(56) References Cited

U.S. PATENT DOCUMENTS

| 6,243,020 B1 * | 6/2001 | Lam | G06F 13/1605 340/635 |
| 7,064,498 B2 * | 6/2006 | Dowling | A61N 5/0616 315/291 |
| 9,263,093 B2 * | 2/2016 | Bunker | G11B 33/10 |

(Continued)

*Primary Examiner* — Henry Tsai
*Assistant Examiner* — Dean Phan
(74) *Attorney, Agent, or Firm* — Kenneth Altshuler

(57) ABSTRACT

Embodiments described are generally directed to a mass storage unit possessing a plurality of non-volatile data storage devices each possessing non-transitory mass storage memory hardware, a drive message router possessing with a plurality of different light sequence instructions retained therein, a motherboard that is connected to each of the non-volatile data storage devices and the drive message router via a bus that is adapted to transfer data via a data storage protocol arranged for mass data storage, a bezel electrically connected to the drive message router via an electrical cable that is adapted to transfer signals in a non-data storage protocol, a plurality of lights visibly disposed on the bezel. The drive message router is adapted to receive a data packet in the data storage protocol from the motherboard via the bus. Once received, an execution instruction is extracted from the message to carry out a subset of the light sequence instructions in a particular order. A sequence of electrical signals is transmitted from the drive message router to the plurality of lights based on the subset of the light instructions via the electrical cable. The plurality of lights are illuminated as dictated in the sequence of electrical signals.

20 Claims, 10 Drawing Sheets

(56) References Cited

U.S. PATENT DOCUMENTS

2004/0008484 A1\* 1/2004 Konshak ............... G06F 1/184
                                                    361/679.5
2009/0058320 A1\* 3/2009 Chou ............... H05B 37/0254
                                                    315/294

\* cited by examiner

DRIVE MESSAGE ROUTER

CROSS-REFERENCE TO RELATED APPLICATIONS

This application is a non-divisional application which claims priority to and the benefit of U.S. Provisional Patent Application Ser. No. 61/978,612 entitled DRIVE CONTROL UNIT filed Apr. 11, 2014, the entire disclosure of which is hereby incorporated by reference.

BACKGROUND OF THE INVENTION

1. Field of the Invention

The present invention relates generally to passing from a server using a storage protocol to an endpoint device that does not use the storage protocol, which is advantageous in eliminating the need for a separate communication link. More particularly, some embodiments of the present invention relates to controlling sequences in a light bar on a JBOD device that is linked to the server via a storage device emulator.

2. Description of Related Art

In a computer system, status lights are used to indicate certain activities in which the computer is engaged. For example, a single light on the front of a computer system may indicate that the computer is on. Such a light simply receives power when the computer system is turned on. In yet a more complex system of lights, a light may blink or change color to indicate a certain activity or problem. In the more complex system of lights a controller associated with the lights receives a signal in a protocol that instructs the lights to blink, change color, etc. In that system a server or origination point is directly linked to the lights to control the lights. In a computer system, these lights are connected to the motherboard controller, or some other controller through a separate communications cable.

It is to innovations related to controlling lights in computer system that the present invention is generally directed.

SUMMARY OF THE INVENTION

The present invention relates generally to passing commands from a server using a storage protocol to an endpoint device that does not use the storage protocol, with embodiments set envision an advantage of eliminating the need for a separate communication link. More particularly, some embodiments of the present invention relates to controlling patterns in a light bar on a JBOD device, or server possessing a plurality of storage devices, that is linked to the server via a storage device emulator, wherein the light bar is not connected to the server via a separate communications cable, but rather through the internal bussing communications hierarchy via a storage device.

Some embodiments of the present invention contemplate a multi-drive non-transient storage unit (mass storage unit) comprising: a plurality of disk drives each possessing at least one magnetic disk and a disk drive connector; a DEMR possessing the disk drive connector, a controller, and solid state storage, the drive message router does not possess a magnetic disk; a motherboard that is connected to each of the disk drives and the drive message router via the disk drive connectors, wherein the motherboard is adapted to communicate to each of the disk drives and the drive message router via a disk drive protocol, the drive message router is seen as a disk drive by the motherboard; a bezel electrically connected to the drive message router via a bus that is adapted to transfer data in a non-disk drive protocol; a plurality of lights visibly disposed on the bezel; a plurality of different light patterns (instructions) retained in the solid state memory, wherein each of the light patterns instructs the plurality of lights to illuminate in a different sequence; and a data packet retained in the solid state memory wherein the data packet includes a message to execute a subset of the plurality of different light patterns, the data packet originating from the motherboard, based on the message to execute the controller adapted to control illumination of the plurality of lights in the subset of the plurality of different light patterns via the non-disk drive protocol.

Other embodiments contemplate method providing a mass storage unit possessing a plurality of disk drives each possessing at least one magnetic disk, a drive message router possessing a plurality of different light patterns retained in non-transitory solid state memory, the drive message router does not possess a magnetic disk, a motherboard that is connected to each of the disk drives and the drive message router via a bus that is only adapted to transfer data via a disk drive storage protocol, a bezel electrically connected to the drive message router via an electrical cable that is adapted to transfer data in a non-disk drive protocol, a plurality of lights visibly disposed on the bezel; transferring a data packet from the motherboard to the drive message router via the disk drive storage protocol over the bus; extracting an execution instruction from the message to execute a subset of the light patterns in a particular order; retrieving the subset of the light patterns from the non-transitory solid state memory; transmitting a sequence of electrical signals from the drive message router to the plurality of lights based on the subset of the light patterns via the electrical cable; and illuminating the plurality of lights as dictated in the sequence of electrical signals.

Yet other embodiments of the present invention contemplate a method comprising: providing a mass storage unit possessing a plurality of non-volatile data storage devices each possessing non-transitory mass storage memory hardware, a drive message router possessing with a plurality of different light patterns retained therein, a motherboard that is connected to each of the non-volatile data storage devices and the drive message router via a bus that is adapted to transfer data via a data storage protocol arranged for mass data storage, a bezel electrically connected to the drive message router via an electrical cable that is adapted to transfer signals in a non-data storage protocol, a plurality of lights visibly disposed on the bezel; the drive message router receiving a data packet in the data storage protocol from the motherboard via the bus; extracting an execution instruction from the message to carry out a subset of the light patterns in a particular order; transmitting a sequence of electrical signals from the drive message router to the plurality of lights based on the subset of the light patterns via the electrical cable; and illuminating the plurality of lights as dictated in the sequence of electrical signals.

DETAILED DESCRIPTION

Initially, it is to be appreciated that this disclosure is by way of example only, not by limitation. The data transfer concepts herein are not limited to use or application with any specific system or method for converting storage device data packets to endpoint devices, such as lights, which are not related to storage devices. Thus, although the instrumentalities described herein are for the convenience of explanation, shown and described with respect to exemplary embodiments, it will be appreciated that the principles herein may be applied equally in other types of storage element system and controlled devices and methods involving the storage of data and the control of non-storage devices via the data stored on the storage elements.

Certain embodiments of the present invention are generally directed to sending commands from an initiation point to an endpoint device through a storage device, or an intermediate device that emulates a storage device, and a bus attached to the storage device to eliminate the need for separate links between the initiation point and the endpoint device.

Figure 1A:
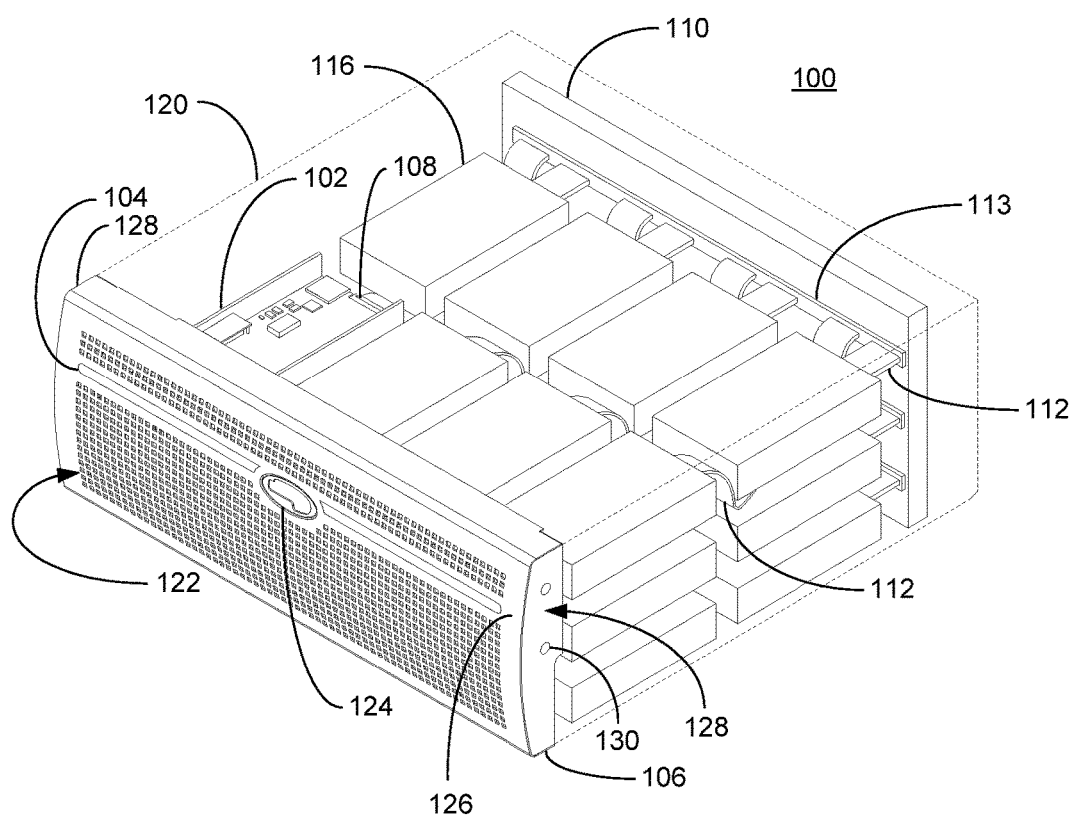
FIG. 1A is an illustration of a JBOD device that incorporates a drive message router in accordance with certain embodiments of the present invention.
Figure 1B:
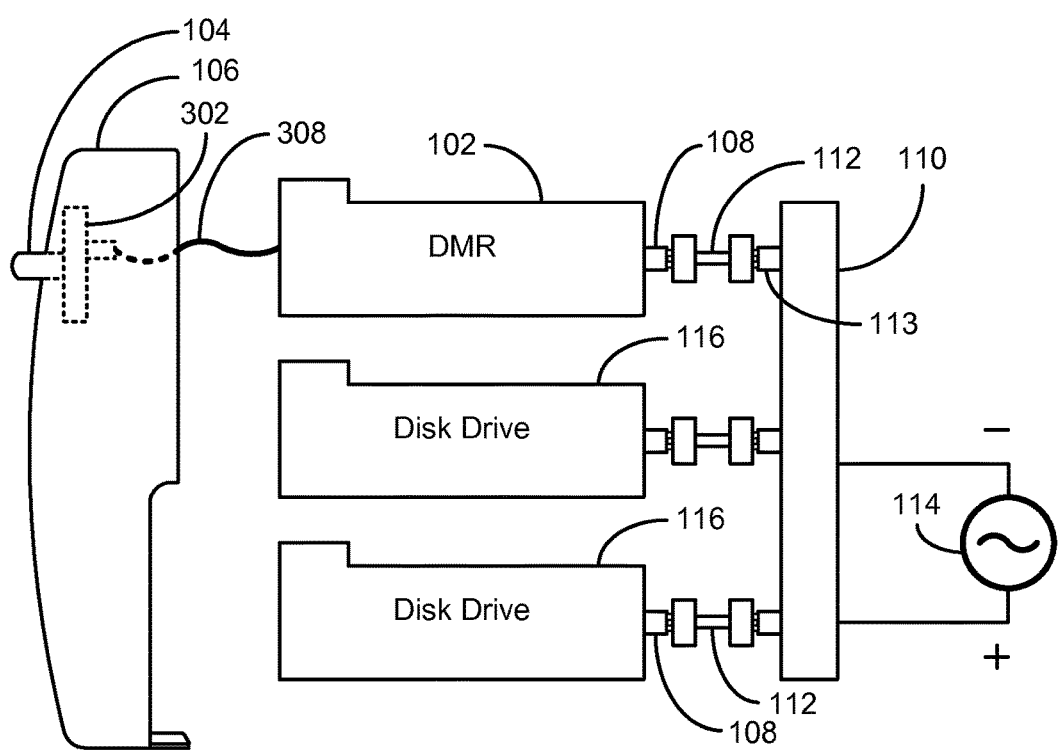
FIG. 1B is a side view block diagram of the JBOD device that incorporates a drive message router in accordance with certain embodiments of the present invention.

To illustrate an exemplary environment in which preferred embodiments of the present invention can be advantageously practiced, FIGS. 1A and 1B show a multi-drive non-transient storage unit (mass storage unit) 100 that possesses a plurality of non-transitory memory devices 116. For purposes of description, but not limitation, disk drives, which each include at least one rotary magnetic disk, will be used as an example of mass storage non-transitory memory devices 116 for embodiments described herein. Other non-transitory device embodiments contemplated are solid state memory drives (SSD), magneto-optical disk drives, holographic memory devices, non-removable media, or other kinds of mass storage memory devices that are intended to function within the scope and spirit of the present invention. Mass storage memory devices are those which are adapted to store large amounts of data in a persisting and machine-readable fashion. Of course, the term "mass storage" is highly dependent on time fame and market segment. For purposes of this description, "mass storage" is considered permanent or semi-permanent storage of large data files or lots of smaller data files, both of which consume large amounts of space (such as documents or digital files intended for archive or semi archive purposes). By 2014 standards, mass storage on such devices provides sufficient memory to retain at least terabytes of data if not petabytes of data, for example. In the future, the amount of data considered mass storage is likely to shift upwards as done historically, however this does not change the concept of mass storage. Also, for purposes of this description and meaning of the claims, the term "non-transitory memory" means a tangible data storage device, including non-volatile memories (such as flash memory, disk drives, and the like) and volatile memories (such as dynamic random access memory and the like). Computer instructions either permanently or temporarily reside in the non-transitory memory, along with other information such as user data, virtual mappings, operating systems, applications, and the like that are accessed by a computer processor to perform the desired functionality. The term "non-transitory memory", or just "memory" expressly does not include a transitory medium such as a carrier signal, but the computer instructions can be transferred to the memory wirelessly.

With continued reference to the mass storage unit 100 of FIGS. 1A and 1B, in addition to the disk drives 116, the mass storage unit 100 also generally includes a Drive Message Router 102, hereinafter referred to as a DMR, a motherboard 110, and a bezel 106. The DMR 102 possesses a disk drive connector 108, which is the same connector as is on the other disk drives 116, for example a SATA (Serial Advanced Technology Attachment) connector or a SAS (Serial Attached SCSI) connector. Generally speaking, the DMR 102 possesses at least a controller and some solid state memory, but unlike a disk drive 116, the DMR 102 does not possess a magnetic disk. The motherboard 110 is connected to each of the disk drives 116 and the DMR 102 by way of bus cables 112, such as a SATA bus cable or SAS bus cable also considered a SAS/SATA hierarchy, that connect to the disk drive connectors 108 and the bus connectors 113. Accordingly, the motherboard is adapted to communicate to each of the disk drives 116 and the DMR 102 via a disk drive protocol (i.e., SATA protocol or SAS protocol, for example). Hence, when communicating with the DMR 102, the motherboard 110 sees (identifies) the DMR 102 as a disk drive 116. Essentially, a disk drive protocol is a protocol that moves data to and from computer storage devices, such as the disk drives 116 for example.

Figure 2:
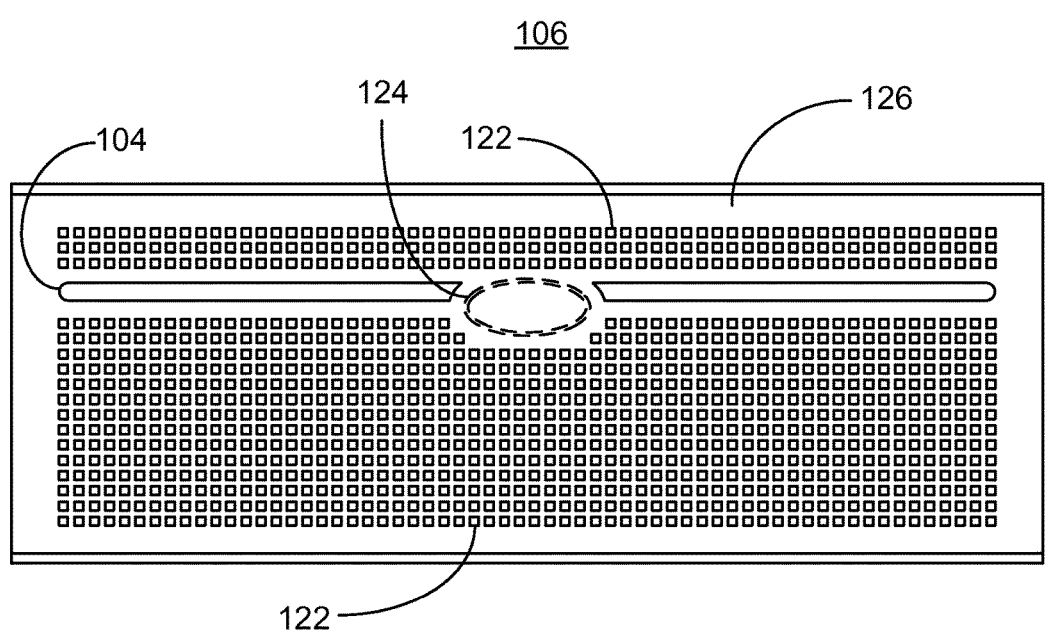
FIG. 2 is a front view of the JBOD device with light bars disposed thereon in accordance with certain embodiments of the present invention.

With reference to FIG. 2, depicted therein is a front view of the bezel 106 shown in FIG. 1 consistent with embodiments of the present invention. The bezel 106 possesses an array of openings 122, or vent holes, in the face of the bezel 126 to facilitate the movement of air across the disk drives 116 and the DMR 102 in order to provide cooling during operation (convective cooling to manage/remove heat built up). Light bars 104 are disposed on the face of the bezel 126. In one embodiment, the light bars 104 comprise a semi-opaque material, such as Mylar or fogged glass, that covers a plurality of illuminating devices (not shown), such as light emitting diodes for example. The light bars 104 disperse the light that is emitted from the illuminating devices to provide a soft, hazed, illumination effect. Certain embodiments contemplate the illuminating devices being capable of emitting light in a plurality of different colors. The bezel 106 depicted possesses a label location 124 that provides a location for an insignia, such as the Spectra logo.

Figure 3:
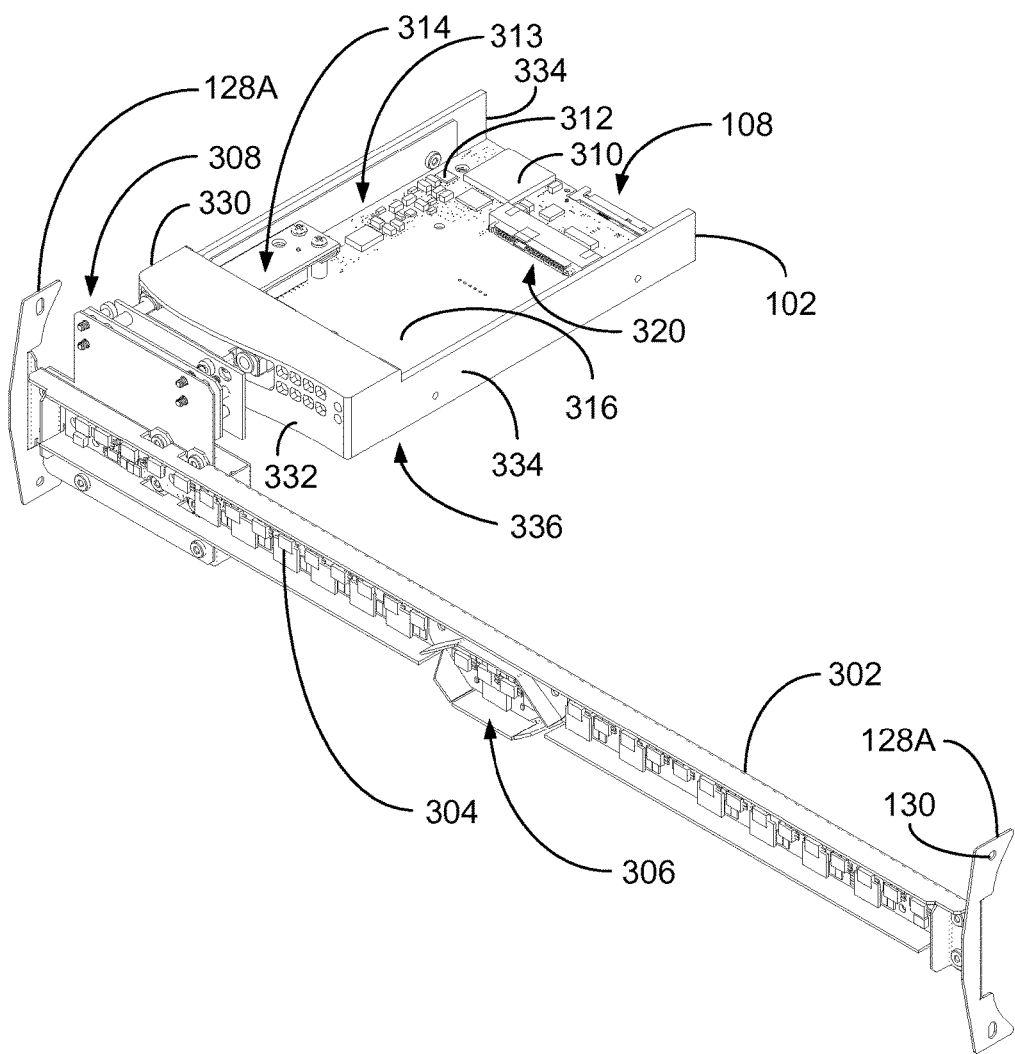
FIG. 3 is a perspective view illustration of a light bar and a drive message router in accordance with certain embodiments of the present invention.

FIG. 3 depicts an embodiment of a light bar and DMR structure 300, consistent with embodiments of the present invention. The DMR 102 possesses a disk drive connector 108, a controller 310 (such as a Xilinx (Spartan-6 FPGA, produced by Xilinx of San Jose, Calif.), solid state memory 312 (such as SPI Flash 64 Mbit memory, produced by Winbond Electronics Corporation of Taiwan), and other necessary circuitry 313 (resistors, FETs, dynamic RAM, etc.) electrically attached to a printed circuit board 316. The DMR 102 is electrically connected as well as physically connected to the light bar 302 via a Light Bar to DMR Interface Connector 308. The light bar 302 comprises a plurality of Light Emitting Diodes (LEDs) 304 that are interconnected and powered through the Light Bar to DMR Interface Connector 308 via a power supply 114 by way of the motherboard 110, bus cable 112, and DMR 102. Also shown is a shielded LED section 306 that is adapted to illuminate the label location 124. The light bar 302 and DMR structure 300 is fixedly attached to the sides of the bezel 128 by the attachment wings 128A via bolts (not shown) that are tightened in place through bolt holes 130.

Figure 4:
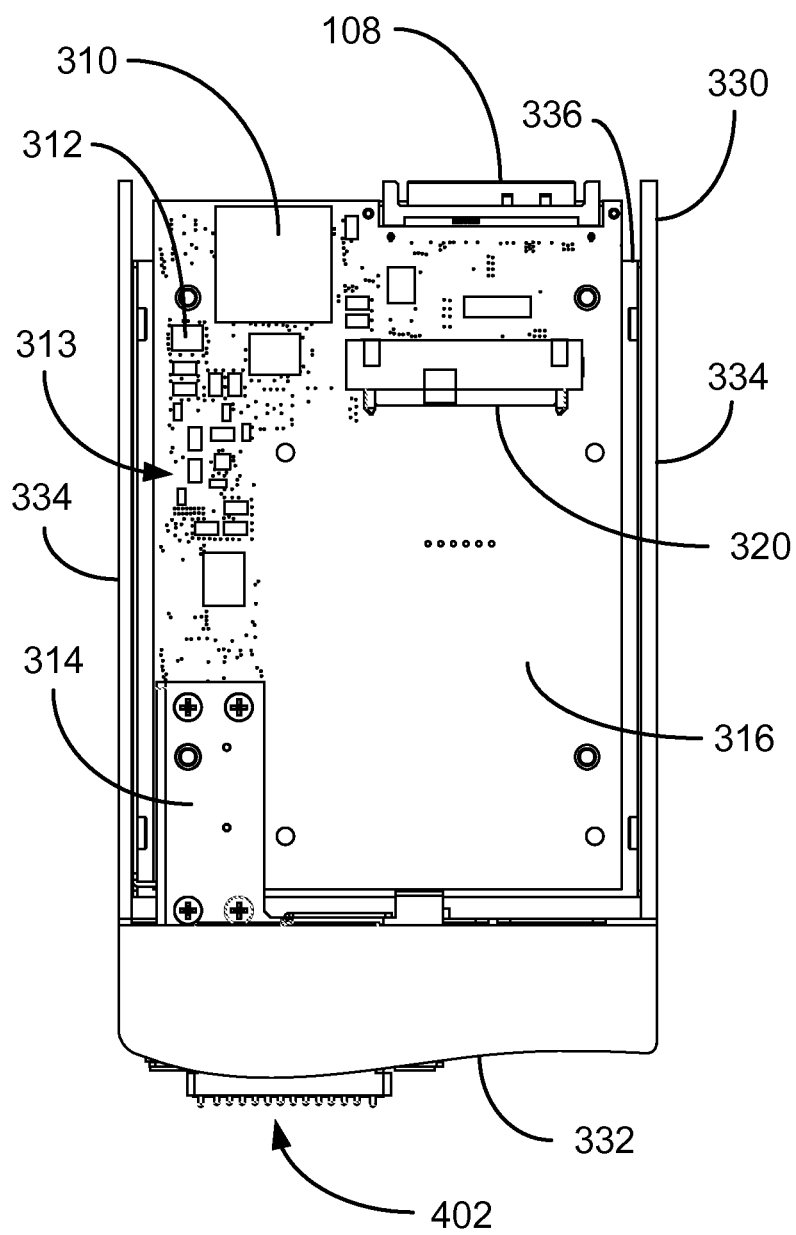
FIG. 4 is a top view illustration of a drive message router in accordance with certain embodiments of the present invention.
Figure 5:
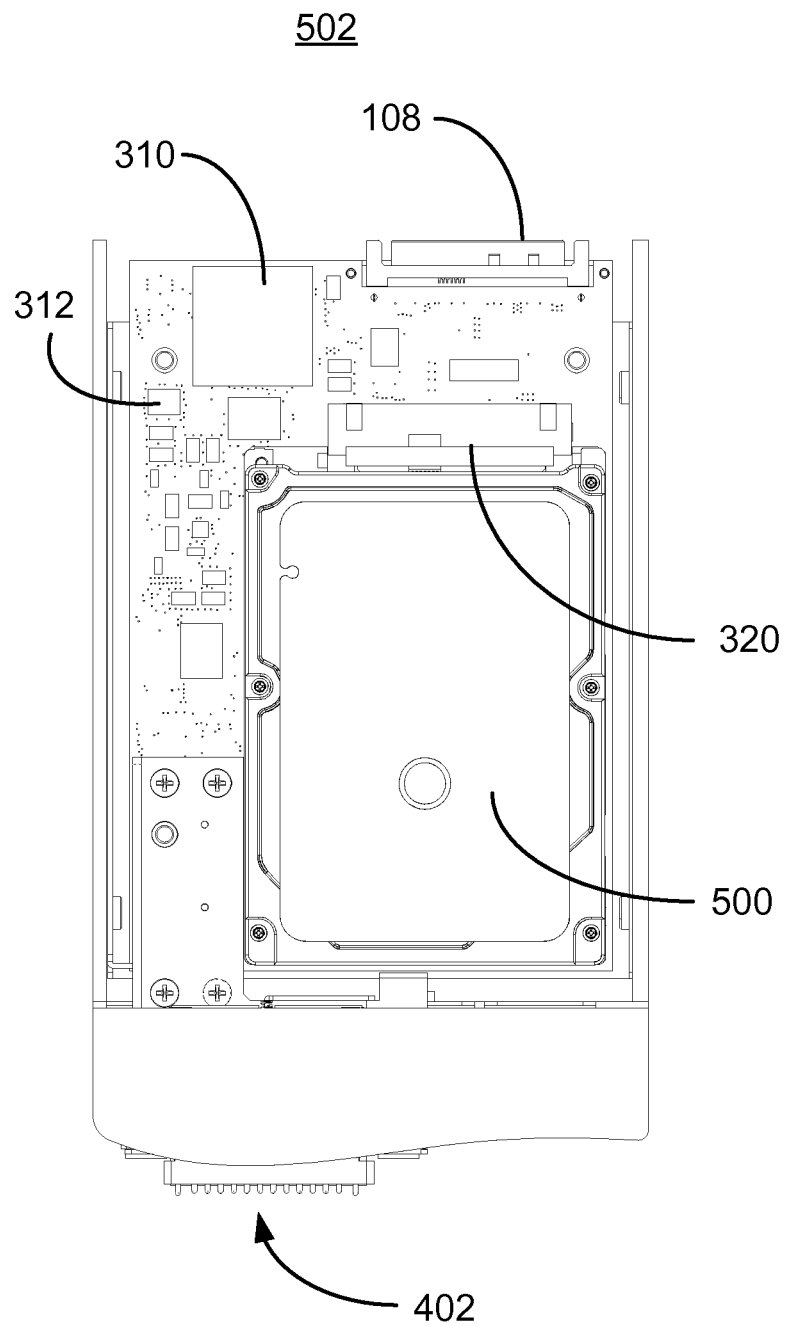
FIG. 5 is a top view illustration of another embodiment of a drive message router possessing a disk drive in accordance with certain embodiments of the present invention.

FIG. 4 depicts a top view of the embodiment of the DMR 102, consistent with embodiments of the present invention. The DMR 102 possesses a disk drive connector 108 that is adapted to connect to the motherboard 110 via disk drive cables 112, a controller 310, solid state memory 312, and other necessary circuitry 313 electrically attached to a printed circuit board 316. In the present embodiment, the DMR 102 provides an auxiliary storage device connector 320 for a solid state drive (SSD) or disk drive. Other preferred embodiments do not have a disk drive or other mass storage device in addition to the solid state memory 310. The DMR 102 is generally comprised of the drive sled 330, which is a support structure that houses the PCB (Printed Circuit Board) 316 and other electrical components. In this embodiment, the drive sled 330 possesses a front 332, two sides 334 and a base 336. One embodiment contemplates the drive sled 330 to be the same form factor as one of the plurality of non-transitory memory devices 116, such as a standard 3.5 inch disk drive, 2.5 in disk drive or standard SSD, for example. In this embodiment, the drive sled 330 fits into the array of other disk drives 116 equally and uniformly for a number of reasons including even use of space, manufacturing, aesthetics, etc. The electrical signals processed by the controller 310 pass through the bezel/drive adapter 314 to circuitry leading to the individual lights 304 in the light bar 302 via signal distribution circuitry. FIG. 5 depicts an embodiment of a DMR 502 comprising a mass storage device 500, consistent with embodiments of the present invention. Here, the mass storage device 500 can be used as another mass storage device adding to the array of other mass storage devices 116. Hence, because of the mostly vacant space in the DMR 502, the additional mass storage device (disk drive or SSD, for example) 500 can add to the overall storage capacity of the mass storage unit 100. This embodiment contemplates the DMR passing commands through to the LEDs 304 independent of the mass storage device 500.

Figure 6A:
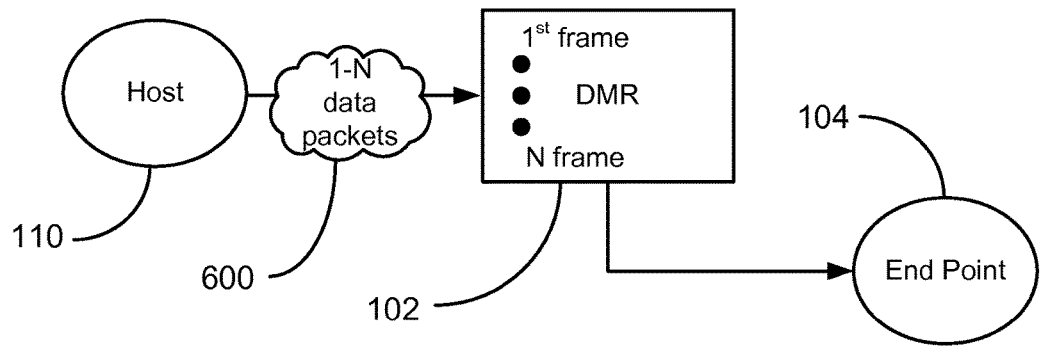
FIGS. 6A-6C describe sending information to an endpoint device from a server via a storage device in accordance with certain embodiments of the present invention.
Figure 6B:
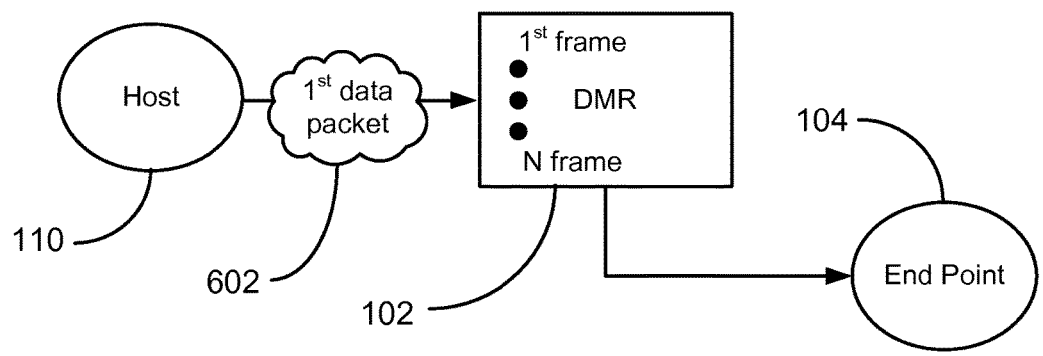
Figure 6C:
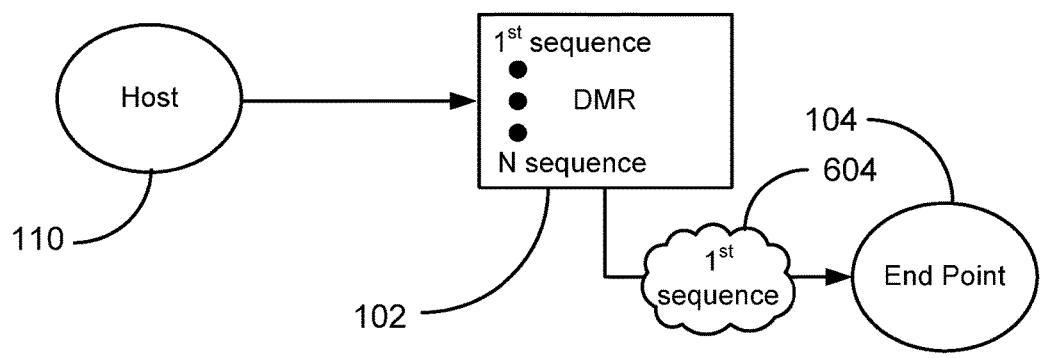

FIGS. 6A-6C depict a basic block diagram method embodiment of using the DMR 102 to pass computer instructions from the motherboard 110 to the light bar 104 to illuminate the lights 304, consistent with embodiments of the present invention. In the present embodiment, the motherboard 110 (or other host, such as a PC, remote computer, etc.) sees the DMR 102 as a disk drive with disk drive indicia, such as a serial number, for example. Accordingly, the motherboard 110 is arranged and configured to send data packets that are intended to be stored to a disk drive, e.g., via SATA or SAS protocol. In so doing, the mass storage data unit 100 is streamlined to power and control the illumination effects of the light bars 104 without sacrificing space consumed by the mass storage devices with special cables and controllers.

As illustratively shown in FIG. 6A, upon initialization (when the mass storage unit 100 is first set up or reconfigured) the motherboard 110 sends a plurality of light patterns (1-N) 600 (which are essentially light sequence instructions) to the solid state memory 312 in a mass storage device protocol, for example data packets intended to be sent to a disk drive via a SATA or SAS protocol. Certain embodiments contemplate sending one pattern at a time to be loaded until all patterns 600 are retained in solid state memory 312. A pattern is an animation sequence of frames, wherein one frame can be considered a snapshot of a display of lights on the light bar 104 at any particular moment, or the like (perhaps one movement of a device, etc.). Other embodiments contemplate each pattern being one sector data packets, wherein one sector in certain embodiments are 512 bytes of digital data. In computer disk storage, a sector is a subdivision of a track on a magnetic disk or optical disc. Each sector stores a fixed amount of user-accessible data, traditionally 512 bytes for hard drives and 2048 bytes for CD-ROMs and DVD-ROMs. Newer hard drives use 4096-byte (4 KB) sectors, known as the Advanced Format. Yet other embodiments contemplate 1-N patterns 600 being sent in groups or one complete data file. Each light sequence includes instructions to illuminate the plurality of lights 304 in a different pattern, such as specific order, specific color, changing color, for a specific duration (whether blinking or illuminating for a sustained period of time, e.g., 5 seconds to multiple hours), with constant or changing intensity (i.e., lumen intensity), with a staggered sequence from a first light to a second light, etc. Once the mass storage unit 100 is in operation and the light sequences (1-N) 600 are retained by the DMR 102 (or more specifically the solid state memory 312), the motherboard 110 evaluates the status of each of the disk drives 116 in the mass storage unit 100. Based on that evaluation, the motherboard 110 sends a first data packet 602, which is arranged to be stored to a disk drive, which in reality is the DMR 102 as depicted in FIG. 6B. Contained in the first data packet 602 is a first message to execute one of the plurality of light sequences retained by the DMR 102. In this example, the first message is in a non-disk drive protocol and contains instructions to execute the first sequence. As illustratively shown in FIG. 6C, the controller 310 carries out the non-storage related protocol instructions to illuminate the plurality of lights 304 in the first sequence. Some embodiments contemplate the motherboard 110 continuously evaluating the disk drives 116 to determine if there is any change in the state of one or more of the disk drives 116. If there is, a second data packet is sent to the DMR 102 containing a second message to execute a second sequence by the controller, which in turn illuminates the plurality of lights 304 in a different sequence. Some embodiments contemplate commencing with illuminating the lights via a specified sequence prior to loading all N sequences 600.

For example, when the mass storage unit 100 is operating normally, the light bars 104 may simply illuminate green indicating that all is well. When there is a problem with one of the disk drives 116, the light bars 104 may illuminate flashing red lights. After a power outage or unexpected reboot of the mass storage unit 100, the light bars 104 may sequence the lights 304 to produce the effect of a standing red light (or blue light, or yellow light, or some combination) that moves from left to right across the light bars 104. Other embodiments contemplate the motherboard 110 or other component in the mass storage unit 100 other than a disk drive 116 failing to operate correctly, thus invoking the motherboard 110 to send another instruction, such as all lights 304 flashing purple if a fan fails, for example. Another example is if each light in the light bars 104 corresponds to a disk drive 116, that light illuminates when the corresponding disk drive 116 is performing storage operations (one example contemplates illuminating one color when saving data and a different color when retrieving data). As exemplified here, a number of different sequences can be imagined and implemented easily.

Figure 7:
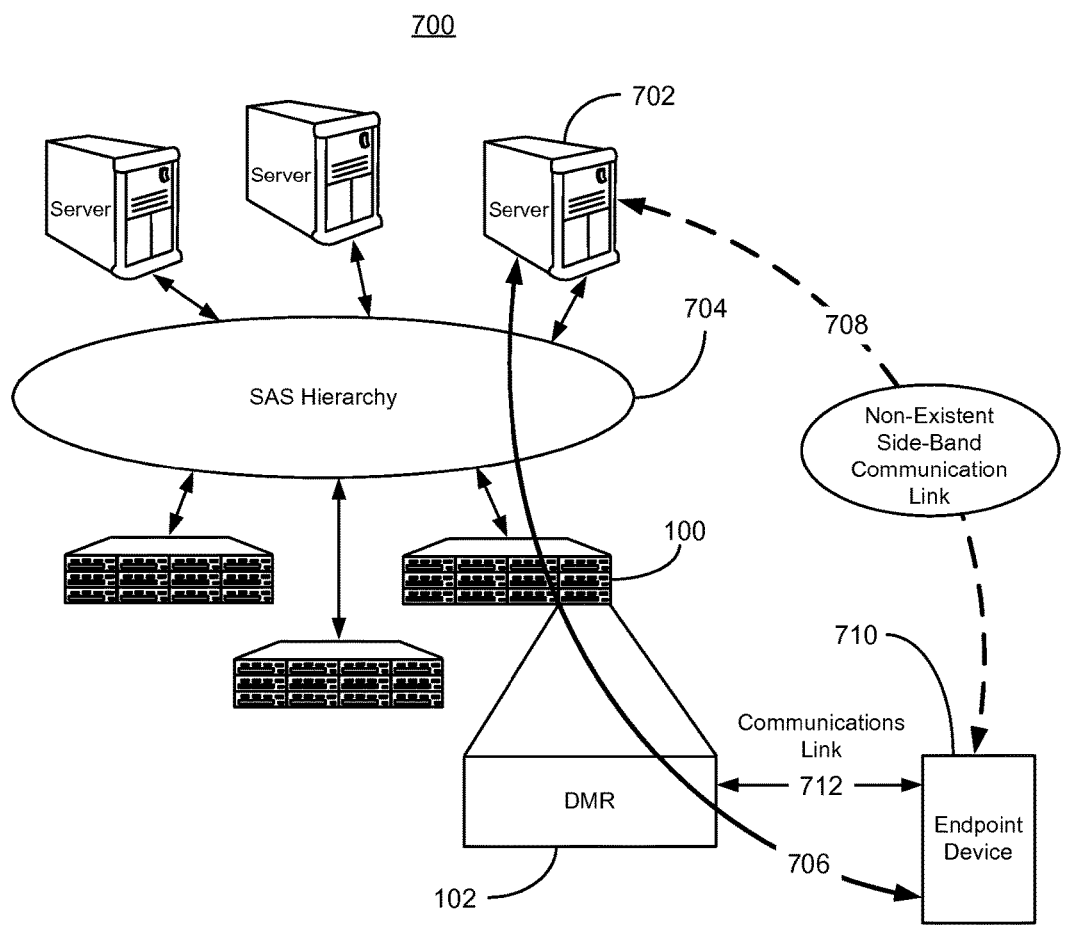
FIG. 7 is a system incorporating the drive message router and the endpoint device in accordance with certain embodiments of the present invention.

A commercial environment in which embodiments of the present invention can be advantageously practiced includes a Spectra Logic a Black Pearl data system 100 of FIG. 1A, which is an archive grade disk drive array (a mass storage JBOD, Just a Bunch Of Drives) produced by Spectra Logic Corporation of Boulder, Colo. FIG. 7 depicts an illustrative embodiment of a system environment 700 wherein a server 702 is in communication with a non-storage SAS/SATA endpoint device 710 (for example, the light bar 104) over an in-band communication path 706, which in certain embodiments can be a general purpose communication path. In the depicted embodiment, a server 702 is not in communication with the endpoint device 710 by way of a side band communication link 708, shown here in dashed lines because it is non-existent. In the present embodiment, the endpoint is a light bar 104, other actionable devices can be equally used (e.g., robots, motorized, devices, transmitters, speakers, etc.). Other endpoint embodiments can be controlled to provide some kind of function or action based on commands coming through a storage device or storage emulation device without going through a sideband connection. The DMR 102 can be constructed as a PCB assembly 316 that operatively functions as a general purpose communication portal, yet is recognized by the servers 702 as a standard disk drive 116. The PCB assembly 316 can be mounted in a standard disk drive sled 330, which can be inserted in any JBOD, such as the Black Pearl, or server drive slot, just to name several examples. The DMR memory includes enough storage for a single 512 byte sector, which serves as both transmit and receive buffer for application-layer command and response messages. The number of sectors may be expanded to accommodate concurrent communications with multiple endpoints (not shown).

In one operational example, when the DMR 102 is installed in a drive slot, it is discovered as a single-sector disk drive with a proprietary model number by the server 702. A command sequence begins when a server 702 sends an application-level command to the endpoint device by writing the command to a single sector (such as, sector zero) of the DMR 102. The DMR 102 notifies the endpoint device 710 that a command has arrived, and the endpoint device reads the command via an unspecified communications link 712. The endpoint-device 710 processes the command and sends a response to sector zero of the DMR 102. The DMR 102 informs the server 702 that the command has been processed by sending a write-sector completion status message to the server 702. To retrieve the response the server 702 must perform a separate read of sector zero. Here, communication sequences initiated by the endpoint-device 710 are not supported.

Figure 8:
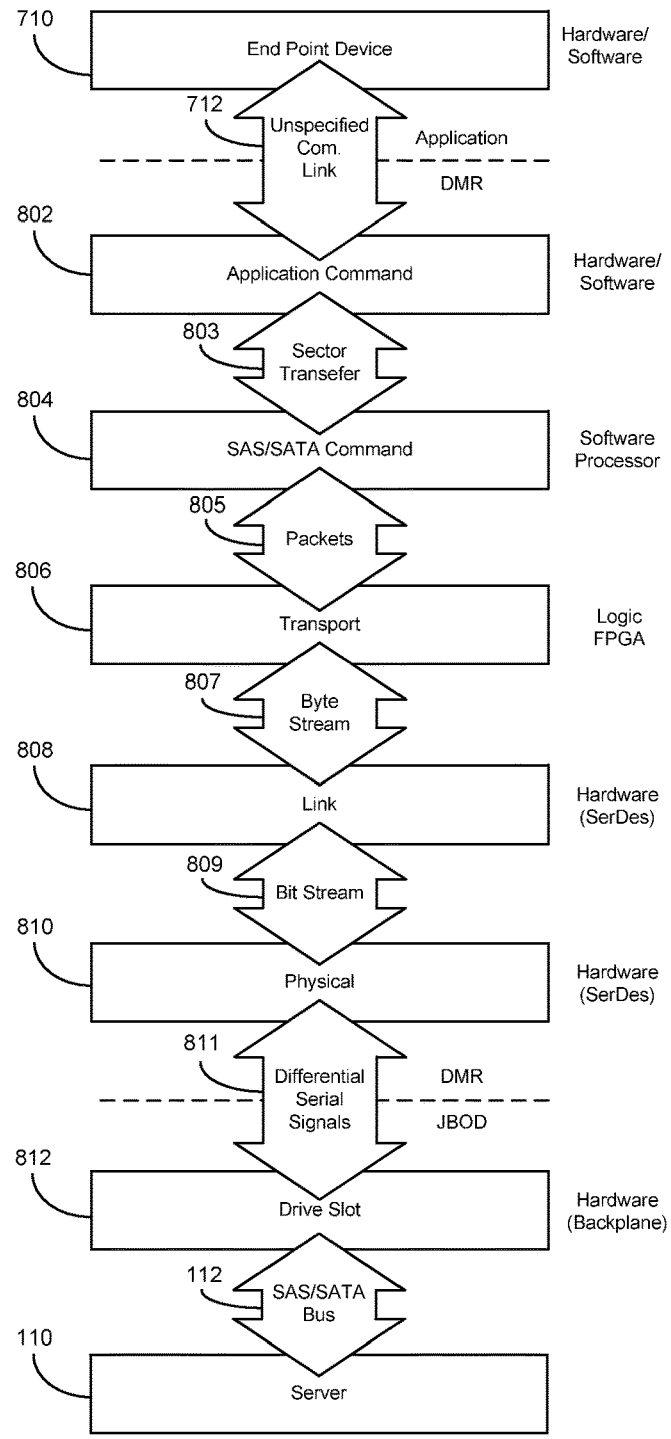
FIG. 8 is a block diagram of a method of the hardware and software steps and layers constructed in accordance with certain embodiments of the present invention.

FIG. 8 illustratively shows a block diagram of an embodiment of the DMR architecture consistent with embodiments of the present invention. In this embodiment, the DMR 102 is essentially functioning as a single sector disk drive emulator (a non-disk drive that appears to the host or server as a disk drive) with additional responsibilities of providing disk drive access for a custom application layer that services the endpoint device 710.

When installed in a drive slot 812 the DMR 102 communicates with a host/bus adaptor (SAS chip) or expander chip (allows for a plurality of disk drives 116) via two differential serial signals, one for each communication direction. The physical layer 810 receives the differential signal 811 from the motherboard 110 to the DMR drive slot location 812 and performs clock recovery (on a differential signal the signals need to be synchronized at both ends; the motherboard 110 and the DMR 102) to extract a synchronized bit stream 809. The synchronized bit stream 809 is passed to the link layer 808 which performs byte-boundary alignment 807 (synchronizing bytes within a data packet). The aligned byte data 807 includes payload data (the command coming from the motherboard 110, which contains the command that will control the endpoint device 710) as well as control characters (which are the protocol level parts of the data packet that includes, for example start and stop bits, etc.) for flow control (to control the transfer of data) and packet alignment 805. The physical layer 810 and link layer 808 are typically managed by a single gigabit Serializer/Deserializer (SerDes) integrated circuit chip in the DMR 102.

The synchronized byte stream 807 is passed to the transport layer 806 which performs packet insertion and extraction 805 (taking the payload data out from SAS/SATA command to use that commands to control the endpoint device 710). The packet format is specific to the drive protocol format (e.g. SAS, SATA). The transport layer 806 is implemented as logic (which is an algorithm to extract the payload data out from the SAS/SATA packet) in an FPGA (Field Programmable Gate Array).

The transport layer 806 passes the packets 805 to the SAS/SATA command layer 804, which is implemented in software (within the FPGA is doing the data placement like a hard drive). More specifically, the SAS/SATA command layer 804 performs disk drive-related commands, such as read sector, write sector and identify device, by exchanging a sequence of two or more packets 805 with the server or motherboard 110. The SAS/SATA command layer 804 notifies the application layer 802 of a sector transfer 803, when a sector has been written, and waits for application command layer 802 to finish processing the command with the payload data before sending a write-sector completion status to the server 110 (basically the SAS/SATA command layer 804 tells the server 110 that it is complete). When a read-sector SAS/SATA command is issued from the endpoint device 710, the SAS/SATA command layer 804 sends the sector contents to the server 110 without informing the application command layer 802.

The application command layer 802 processes application commands 802 to execute at the endpoint device 710. Application commands 802 and responses between the endpoint 710 and a server are realized (i.e., completed) using sector read and write operations. The application command layer 802 is responsible for managing communications between the endpoint device 710 and the server 110. The communication protocol via the unspecified communication link 712 between the application command layer 802 and the endpoint device 710 is left unspecified. The application command layer 802 is implemented in software.

Figure 9:
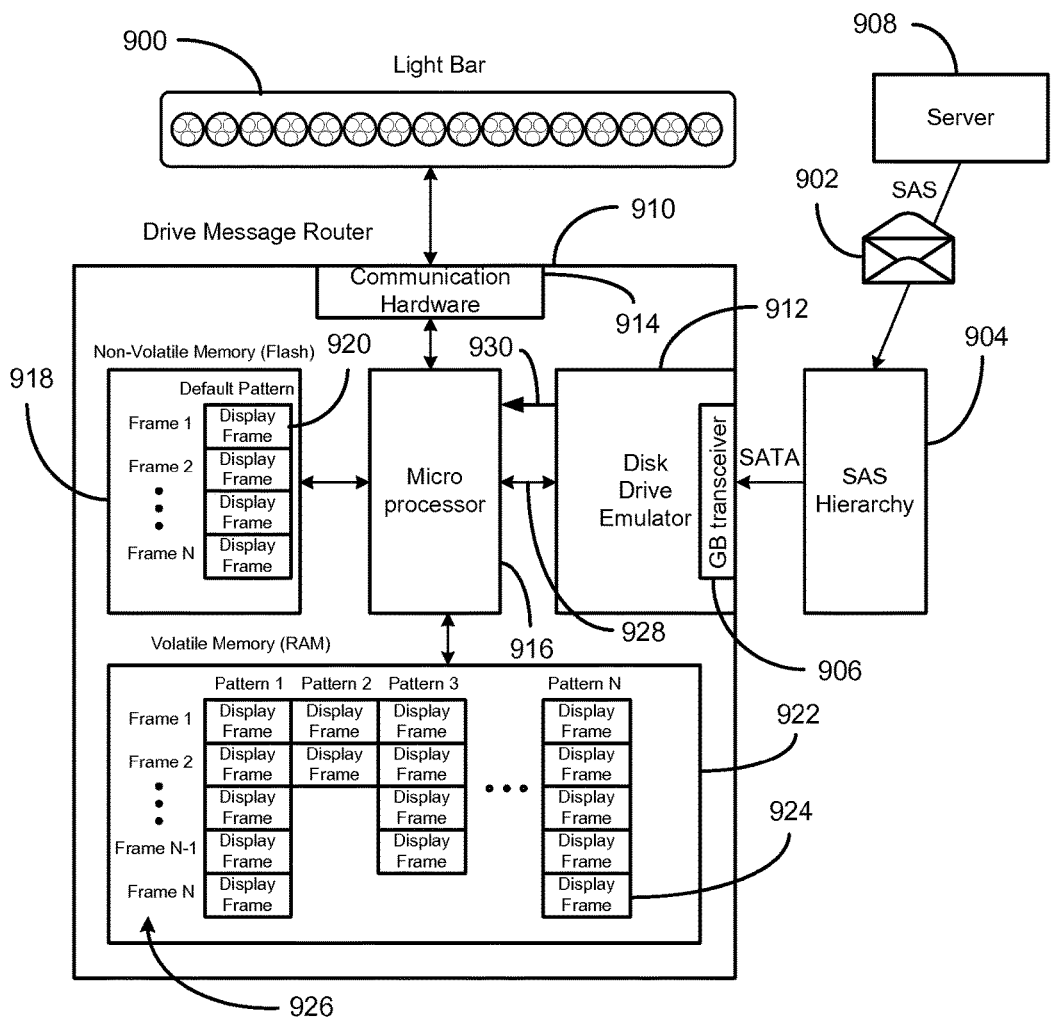
FIG. 9 depicts an embodiment of a drive message router in conjunction with a light bar consistent with embodiments of the present invention.

FIG. 9 depicts an embodiment of a drive message router 910 in conjunction with a light bar 900 consistent with embodiments of the present invention. With reference to the nonvolatile memory 918 in the DMR 910, residing therein is a default pattern 920 of light sequences that instruct the microprocessor 916 to illuminate the light bar 900 in an animated sequence, or light pattern, when the system with the light bar 900 is energized, or turned on. The nonvolatile memory 918, or flash, possesses the default pattern 920, which is used to light up the light bar 900 with the default pattern 920 before the volatile memory 922, or RAM (random access memory), is finished being populated with patterns 924. An example of the default pattern 920 is turning the lights on the light bar 900 blinking red. The microprocessor 916 will evaluate if there is an active connection with the server 908 and when the server 908 is communicatively connected, the server sends a data packet 902 (such as a single sector data packet of 512 bits), or envelope, which carries frame definitions and commands 926. The data packet 902 passes to the gigabit transceiver 906 and the disk drive emulator 912 via the SAS hierarchy 904, which is essentially an SAS bus and SAS protocol, which converts the commands to SATA commands. The disk drive emulator 912 sends an "interrupt" command to the microprocessor 916 indicating a data packet 902 is at the disk drive emulator 912. In one embodiment, the microprocessor 916 reads the single sector data packet 902, which could be a display frame 926 that is sent to the RAM 922. Envelope 902 by envelope 902, each pattern 924 in the RAM 922 is constructed one frame at a time. In this embodiment, each pattern 924 is comprised of a plurality of display frames frame 1 through frame N 926. A number of different patterns, such as pattern 1 through pattern N, are loaded in the RAM 922. Once all of the patterns 924 are loaded in the RAM 922, the server 908 may send an envelope 902 with a command to display a particular pattern loaded in the RAM 922, such as pattern number 3 for example. Pattern number 3 is read by the microprocessor 916 and then transferred to the communication hardware 914, which in turn illuminates the light bar 900 in the pattern defined by pattern number 3.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, different kinds of physical devices could be used other than a light bar while still maintaining substantially the same functionality of passing through commands through a storage device, such as in a JBOD, devoid of a sideband connection without departing from the scope and spirit of the claimed invention. Finally, although the preferred embodiments described herein are directed to disk drive device, and related technology, it will be appreciated by those skilled in the art that the claimed invention can be applied to other systems, without departing from the spirit and scope of the present invention.

It will be clear that the claimed invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed invention disclosed and as defined in the appended claims. Accordingly, it is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A multi-drive non-transient storage unit (mass storage unit) comprising:
   a plurality of disk drives each possessing at least one magnetic disk and a disk drive connector;
   a drive message router possessing the disk drive connector, a controller, and solid state storage, the drive message router does not possess a magnetic disk;
   a motherboard that is connected to each of the disk drives and the drive message router via the disk drive connectors, wherein the motherboard is adapted to communicate to each of the disk drives and the drive message router via either a SATA or SAS protocol, the drive message router is seen as a disk drive by the motherboard;
   a bezel electrically connected to the drive message router via a bus that is adapted to transfer data in a SATA or SAS protocol;
   a plurality of lights visibly disposed on the bezel;
   a plurality of different light sequence instructions retained in the solid state memory, wherein each of the light sequence instructions instructs the plurality of lights to illuminate in a different pattern; and
   a data packet retained in the solid state storage wherein the data packet includes a message to execute a subset of the plurality of different light sequence instructions, the data packet originating from the motherboard, based on the message to execute the controller adapted to control illumination of the plurality of lights in the subset of the plurality of different light sequence instructions via the SATA or SAS protocol.

2. The multi-drive non-transient storage of claim 1 wherein the plurality of different light sequence instructions include a first light sequence instruction and a second light sequence instruction, the first and the second light sequence instructions are each no larger in capacity than a single drive sector, the drive message router adapted to receive only one of the first light sequence instruction or the second light sequence instruction at a time.

3. The multi-drive non-transient storage of claim 2 wherein the single sector is 512 bytes.

4. The multi-drive non-transient storage of claim 1 wherein the data packet is triggered to be sent based on a communication status of one of the plurality of disk drives.

5. The multi-drive non-transient storage of claim 1 wherein the drive message router possesses at least length and width dimensions that are the same for factor as the disk drives.

6. The multi-drive non-transient storage of claim 1 wherein the data packet is configured to be stored on one of the disks in one of the disk drives.

7. A method comprising:
   providing a mass storage unit possessing a plurality of disk drives each possessing at least one magnetic disk and either a disk drive SATA or SAS connector, a drive message router equipped with the SATA or SAS connector possessing a plurality of different light sequence instructions retained in non-transitory solid state memory, the drive message router does not possess a magnetic disk, a motherboard that is connected to each of the disk drives and the drive message router via a bus that is only adapted to transfer data via a SATA or SAS storage protocol, a bezel electrically connected to the drive message router via an electrical cable that is adapted to transfer data in a SATA or SAS protocol, a plurality of lights visibly disposed on the bezel;

transferring a data packet from the motherboard to the drive message router via the disk drive storage protocol over the bus;

extracting an execution instruction from the data packet to execute a subset of the light sequence instructions in a particular order;

retrieving the subset of the light instructions from the non-transitory solid state memory;

transmitting a sequence of electrical signals from the drive message router to the plurality of lights based on the subset of the light instructions via the electrical cable; and illuminating the plurality of lights as dictated in the sequence of electrical signals.

8. The method of claim 7 wherein the drive message router possesses a controller that is adapted to execute the extracting step, the retrieving step, and the transmitting step.

9. The method of claim 7 further comprising prompting the motherboard to transfer the data packet after the motherboard receives a status update from one of the disk drives.

10. The method of claim 9 wherein the status update includes a problem.

11. The method of claim 7 wherein the drive message router is only capable of receiving the data packet if it is 512 bytes or less.

12. The method of claim 11 wherein the 512 bytes is the size of one disk drive sector.

13. The method of claim 7 further comprising initializing the drive message router by sending the drive message router the plurality of different light sequence instructions one at a time.

14. The method of claim 13 wherein each of the plurality of different light sequence instructions are no larger than that which can be stored on a single sector of a disk drive.

15. The method of claim 7 further comprising repeating the transmitting step of the sequence of electrical signals in a continuous loop from the drive message router to the plurality of lights until a different data packet from the motherboard is received by the drive message router via the bus.

16. The method of claim 7 wherein the drive message router is essentially the same form factor as one of the disk drives.

17. The method of claim 7 wherein the drive message router is seen as a disk drive by the motherboard and the data packet is sent to the drive message router for storage in at least one disk drive sector.

18. A method comprising:
providing a mass storage unit possessing a plurality of non-volatile data storage devices each possessing non-transitory mass storage memory hardware and SATA connector, a drive message router with the SATA connector possessing a plurality of different light sequence instructions retained therein, a motherboard that is connected to each of the non-volatile data storage devices and the drive message router via a bus that is adapted to transfer data via SATA protocol, a bezel electrically connected to the drive message router via an electrical cable that is adapted to transfer signals in a non-SATA protocol, a plurality of lights visibly disposed on the bezel;

a) the drive message router receiving a data packet in the SATA protocol from the motherboard via the bus;

b) extracting an execution instruction from the message to carry out a subset of the light sequence instructions in a particular order;

c) transmitting a sequence of electrical signals from the drive message router to the plurality of lights based on the subset of the light instructions via the electrical cable; and d) illuminating the plurality of lights as dictated in the sequence of electrical signals.

19. The method of claim 18 where the drive message router possesses a non-transitory solid state memory wherein the plurality of different light sequence instructions are retained and retrieving the subset of the light sequence instructions from the non-transitory solid state memory.

20. The method of claim 18 wherein the non-volatile data storage devices are either solid state drives possessing mass storage solid state memory or disk drives possessing mass storage magnetic disk memory, the drive message router possesses neither the mass storage solid state memory nor the mass storage magnetic disk memory.

* * * * *